United States Patent [19]

Beach et al.

[11] Patent Number: 5,084,333
[45] Date of Patent: Jan. 28, 1992

[54] FABRIC PRINTER RIBBON WITH NIGROSINE INK

[75] Inventors: Bradley L. Beach; Matthew D. Clift; Terence E. Franey; James M. Mrvos; Ann M. Piekunka; Agnes K. Zimmer, all of Lexington, Ky.

[73] Assignee: Lexmark International, Inc., Greenwich, Conn.

[21] Appl. No.: 481,412

[22] Filed: Feb. 16, 1990

[51] Int. Cl.$^5$ ............................................. B32B 7/00
[52] U.S. Cl. ............................... 428/272; 400/241.1; 400/241.3; 428/226; 428/229; 428/257
[58] Field of Search ............... 428/226, 229, 257, 272; 101/336; 400/241.1, 241.3

[56] References Cited

U.S. PATENT DOCUMENTS

| | | | |
|---|---|---|---|
| 3,908,063 | 9/1975 | Rosendale et al. | 428/320 |
| 4,361,843 | 11/1982 | Cooke et al. | 346/1.1 |
| 4,624,709 | 11/1986 | Otsuka | 106/22 |
| 4,822,418 | 4/1989 | Lin et al. | 106/27 |

FOREIGN PATENT DOCUMENTS

81029901-B 7/1981 Japan.

*Primary Examiner*—James J. Bell
*Attorney, Agent, or Firm*—John A. Brady

[57] ABSTRACT

A printer ribbon having nigrosine dye with hydroxide counter ion, preferably at 23% by weight, in an oleic acid vehicle to form an ink saturating a fabric. The ribbon has the long life of a dye-only fabric ribbon and is effective for both correspondence and bar code applications.

14 Claims, No Drawings

FABRIC PRINTER RIBBON WITH NIGROSINE INK

DESCRIPTION

1. Technical Field

This invention relates to fabric ribbon for impact printers usable for both general printing and correspondence and for bar code and other printing to be sensed using infrared radiation. The ribbon carries a liquid ink throughout the fabric.

2. Background of the Invention

Nigrosine dye is known to be suitable as a coloring to print both general correspondence and bar code for infrared sensing. In fabric ribbon, however necessary amounts of nigrosine for infrared sensing have not been possible because of prohibitively high viscosity reached after the passage of time by the ink of, typically oleic acid and nigrosine. The viscosity of such inks also increases from their being heated. Consequently, fabric ribbons for bar code printing currently include pigments to absorb infrared radiation, typically carbon black.

Pigments are undesirable since they are solid particles which abrade impact print elements, particularly wire or dot elements. Pigmented inks print significantly less characters on reuse than equivalent inks having only dyes as coloring matter. This is because pigments have little mobility in a fabric. Similarly, pigmented inks do not re-ink well in a ribbon cartridge, such as from a porous roller, also because of the limited mobility of pigments. Finally, fabric ribbon with pigmented inks may exhibit some drag over dye ink in the feeding of the ribbon during use.

Typical nigrosine dye contains quarternary ammonium salts which contain chloride counter ion. Nigrosine is believed to have the following typical structure:

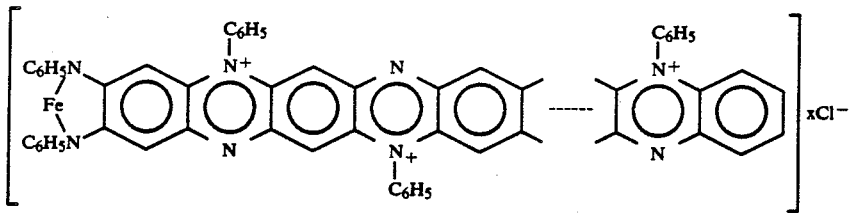

In accordance with this invention a specific form of nigrosine is used with oleic acid or a similar vehicle which achieves a high nigrosine content and maintains moderate viscosities. The specific form of nigrosine is one having no chloride counter ion and may be purchased as nigrosine base EX and nigrosine based EK, products of Orient Chemical Industries, Ltd. Preparation of such a nigrosine is disclosed in Japanese patent 81029901-B dated July 11, 1981 to Orient Kugaky Kogyo, describing reacting nigrosine dye in hydrochloride form followed by extracting with an alkali solution.

A typical structure of nigrosine having hydroxide counter ion in accordance with this invention is believed to be as follows:

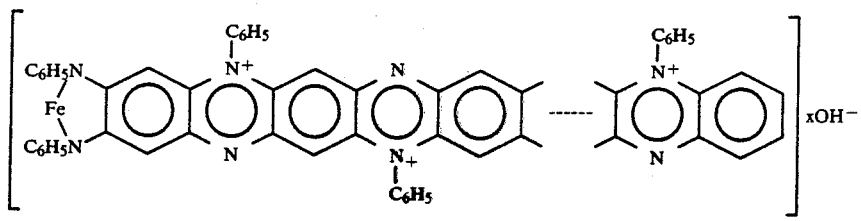

The nigrosine EX and EK are believed to be the only commercially sold nigrosine which are not nigrosine with chloride counter ion. Orient Chemical Industries, Ltd. offers commercially a range of nigrosine base dyes which differ in the amount of chloride counter ion and which are more expensive as the amount of chloride counter ion decreases.

U.S. Pat. No. 4,624,709 to Otsuka teaches dye mixtures employing the EX nigrosine base to fabricate a modified nigrosine. The modified nigrosine and the EX nigrosine in comparative examples are disclosed in ink formulas. These ink formulas have no pigment and the comparative examples have the EX nigrosine and have some oleic acid. However, they have a resin, as well as other ingredients, and use for a woven ribbon is not taught.

U.S. Pat. No. 4,361,843 to Cooke et al teaches a jet ink containing oleic acid, nigrosine generally, and solvent for the nigrosine for use at elevated temperatures. U.S. Pat. Nos. 4,822,418 to Lin et al and 3,908,063 to Rosendale et al disclose nigrosine generally in oleic acid vehicles for bar code infrared-sensed printing. None of these three patents mention fabric ribbon or employ nigrosine of a special kind or the EX nigrosine.

A fabric ribbon sold under the brand name Printronix is understood to contain chloride free nigrosine. Since that ribbon contains major amounts of carbon black as a pigment it departs from an essential criterion of this invention. Furthermore, it has less than 17% by weight nigrosine which is toward the low end of range of nigrosine employed by this invention. Other, known similar commercially available fabric ribbon inks with nigrosine are believed to employ nigrosine with chloride counter ion.

DISCLOSURE OF THE INVENTION

In accordance with this invention nigrosine with hydroxide counter ion in relatively high quantities is employed with a fatty acid vehicle, specifically oleic acid in a woven ribbon free of pigments. The ribbon has the extended life of a dye-only fabric ribbon and may be used for both correspondence and infrared-sensed applications. Increased viscosity with time or heat is not experienced.

Specifically, the nigrosine may be in the range of 15%-30%, typically at least 20%, with the remainder of the ink being oleic acid. Ink viscosity increases dramatically with nigrosine, from 170 cps at 15% nigrosine to 15,000 cps at 30% nigrosine. Infrared reflectance at 900 nm of the resulting printing ranges from 12.2% at 15% nigrosine to 8.1% at 30% nigrosine.

BEST MODE FOR CARRYING OUT THE INVENTION

This embodiment provides general purpose life equivalent to an existing equivalent 100% dye based fabric ribbon. It also achieves bar code yields comparable to existing pigmented inks which contain 10-15% carbon black by weight to provide the absorbance at 900 nm necessary for infrared scanning. Inks containing high loadings of carbon black achieve deficient general purpose life when compared to 100% dye base inks. Pigmented inks also have been shown to cause high drive torque in long ribbon feed paths having guiding surfaces which leads to functional failures of the ribbon feed. It is difficult to re-ink pigmented inks with conventional re-inking devices. Carbon black has also been shown to cause wearing of wire tips of the standard dot matrix printhead. This invention utilizes a modified nigrosine oleate dye to provide 900 nm infrared absorbance with a 100% dye based, pigment free formulation.

Inks containing normal nigrosine oleate undergo a continuous viscosity rise with age. This viscosity rise has resulted in many aging problems seen with fabric inks such as lower life from the ribbon and poor ink release from re-inker rolls. In accordance with this invention, the source of the aging was discovered and is believed to center around 3 mechanisms: 1) As the nigrosine reacts with oleic acid to form the oleate, the viscosity rises as the nigrosine dissolves in the oleic acid. 2) As this oleate is formed, hydrochloric acid is produced which forms the acid chloride salts of the amines that are present in the dye rendering it insoluble in oleic acid. 3) With aging, the nigrosine itself increases in molecular weight. All of the effects are encouraged chemically by heat as well as by the passage of time.

Typical nigrosine dye contains quaternary ammonium salts which contain a chloride counter ion. The hydrochloric acid is produced when the oleic acid replaces the chloride ion on the quat. If the original nigrosine is modified by replacing the chloride ion with a hydroxide ion, then water will be produced instead of HCL and no acid induced viscosity rise will be observed. In addition, the oleate formation is virtually instantaneous. Therefore, the viscosity instability due to continued oleate formation is not observed. With this modification, 2 of the 3 mechanisms for viscosity rise have been eliminated which accounts for roughly 90% of the aging problem.

The following table illustrates the improvements observed when ink with 25% nigrosine is placed in a petri dish at 60° C. and the viscosity is monitored:

| Time (hrs) | Normal Nigrosine Viscosity (cps) | Modified Nigrosine Viscosity (cps) |
| --- | --- | --- |
| 0 | 833 | 1441 |
| 20 | 10270 | 1637 |
| 63 | 27677 | 1938 |

When the starting ingredient is standard nigrosine with chloride counter ion, the chloride ion can be replaced with hydroxide by reacting the nigrosine with methanolic KOH and subsequent washing to remove the KCL which is produced. The nigrosine with hydroxide counter ion is then made into nigrosine oleate by dissolving each in methanol in the proper ratio then evaporating off the methanol.

When standard nigrosine oleate dye is used in an ink, the highest concentration attainable is 10%-15% by weight before viscosity increase begins to become a problem. Using modified nigrosine, the dye concentration can be in the range of 20%-29% at the same viscosity as normal nigrosine at 10%-15%. This improves color strength, ribbon life and 900 nm absorbance. The level of modified nigrosine can be adjusted to optimize life depending on the application.

Preferred Embodiment Ink formula % by weight

| | |
| --- | --- |
| Nigrosine Base EX (Product of Orient Chemical Industries) | 23 |
| Oleic Acid | 77 |
| | 100% |

As previously indicated, the nigrosine EX or nigrosine EK are believed to be the only commercially sold nigrosine which is of the kind described in which the chloride is replaced by hydroxide.

The foregoing ink is applied to a fabric to saturate the fabric, thereby forming a fabric ribbon. Preferably the ribbon will be loaded in a large stuffed cartridge having articulated guided arms forming a closed path as is currently used for the ribbon of the 4224 printer sold commercially by the assignee of this invention, and used for both correspondence and bar code printing by that printer.

The fabric is a standard 5 mil caliper (fabric thickness when clamped in a measuring device at a standard force) textured nylon. The warp (long) threads are not textured, as is standard, while the fill (cross) threads are. The threads are each bundles of 34 filaments, with the warp 40 denier and the fill 70 denier. The difference in denier is for cartridge feed and durability and is not believed to affect the ink. The 5 mil (approximately 0.00127 cm) caliper of the fabric is relatively thick, and this caliper is employed to resist the relatively high impacts of bar code printing.

This ribbon yields 15 million characters at 0.40 minimum print contrast signal, which is fully equivalent with previous dye based ribbon for this printer (The contrast figure is a linear measurement between the blank page and printing measured by the same instrument).

Approximate Bar Code yields are as follows:
633 nm (visible light) - 2500 AIAG* B-3 format labels ANSI (American National Standards Institute) grade 1.5 or better.
900 nm (infrared light) - 1250 AIAG B-3 format labels ANSI grade 1.5 or better.

*AIAG format labels are widely-used shipping labels having bar code. AIAG refers to Automotive Industry Action Group and B-3 to certain of their specific standards, including the B-1 standards which are referenced in B-3. This defines a 3 of 9 bar code (9 elements, of which 3 are wide) ½ inch high with minimum bar or element of 13 mil (approximately 0.0033 cm) which is considered a relatively dense symbol and maximum bar or element width of 17 mil (approximately 0.0043 cm) which is considered a moderately dense symbol. The ratio of the wide elements to narrow elements is 3 to 1. The yield of infrared bar code printing of one half of that for visible light is very favorable. ANSI grade 1.5 normally equates to a correct scan 100% of the time.

Modifications within the spirit and scope of this invention will be apparent, as well as additives not changing the essential function of the two ink ingredients disclosed. In particular other dyes in fatty acid vehicles will diminish the optical effects of the nigrosine by dilution, but the essential effects continue, including the stable viscosity of the ink.

We claim:

1. A printer ribbon comprising a woven fabric and an ink throughout said fabric, said ink consisting essentially of nigrosine with hydroxide counter ion of at least 15 percent by weight of said ink and a fatty acid vehicle, said ink having no substantial pigment or resin.

2. The printer ribbon as in claim 1 in which said fatty acid is oleic acid.

3. The printer ribbon as in claim 2 in which said nigrosine is at least 20 percent by weight of said ink.

4. The printer ribbon as in claim 1 in which said nigrosine is at least 20 percent by weight of said ink.

5. The printer ribbon as in claim 4 in which said nigrosine is about 23 percent by weight of said ink.

6. The printer ribbon as in claim 3 in which said nigrosine is about 23 percent by weight of said ink.

7. The printer ribbon as in claim 6 in which the fabric of said ribbon is texturized nylon 5 mil caliper.

8. The printer ribbon as in claim 1 in which the fabric of said ribbon is texturized nylon 5 mil caliper.

9. The printer ribbon as in claim 2 in which the fabric of said ribbon is texturized nylon 5 mil caliper.

10. The printer ribbon as in claim 3 in which the fabric of said ribbon is texturized nylon 5 mil caliper.

11. The printer ribbon as in claim 4 in which the fabric of said ribbon is texturized nylon 5 mil caliper.

12. The printer ribbon as in claim 5 in which the fabric of said ribbon is texturized nylon 5 mil caliper.

13. The printer ribbon as in claim 6 in which the fabric of said ribbon is texturized nylon of caliper of 5 mil diameter.

14. A printer ribbon comprising a woven fabric and an ink throughout said fabric, said ink consisting essentially of nigrosine with hydroxide counter ion in an amount of 15 to 30 percent by weight of said ink and a fatty acid vehicle, said ink having no substantial pigment or resin.

* * * * *